(12) United States Patent
Schröer et al.

(10) Patent No.: US 8,697,223 B2
(45) Date of Patent: Apr. 15, 2014

(54) VAPOR-PERMEABLE LAMINATE

(75) Inventors: Jörn Schröer, Herdecke (DE); Stefan Kostrewa, Fröndenberg (DE)

(73) Assignee: Ewald Dorken AG, Herdecke (DE)

( * ) Notice: Subject to any disclaimer, the term of this patent is extended or adjusted under 35 U.S.C. 154(b) by 669 days.

(21) Appl. No.: 12/747,697

(22) PCT Filed: Oct. 23, 2008

(86) PCT No.: PCT/EP2008/008962
§ 371 (c)(1),
(2), (4) Date: Jun. 11, 2010

(87) PCT Pub. No.: WO2009/074191
PCT Pub. Date: Jun. 18, 2009

(65) Prior Publication Data
US 2010/0279065 A1    Nov. 4, 2010

(30) Foreign Application Priority Data

Dec. 12, 2007  (DE) .................. 10 2007 060 358

(51) Int. Cl.
*B32B 3/24*         (2006.01)
*B32B 37/14*        (2006.01)
*E04B 2/00*         (2006.01)

(52) U.S. Cl.
USPC ....... 428/137; 428/138; 428/315.9; 52/309.1; 52/408; 156/78; 156/252; 156/244.18

(58) Field of Classification Search
USPC .............. 428/137, 138, 315.9; 52/309.1, 408; 156/78, 252, 244.18
See application file for complete search history.

(56) References Cited

U.S. PATENT DOCUMENTS 6,114,024 A     9/2000  Forte

FOREIGN PATENT DOCUMENTS

| FR | 2 871 822 A1 | 12/2005 |
|----|--------------|---------|
| WO | 01/15898 A1  | 3/2001  |
| WO | 2006/072604 A2 | 7/2006 |
| WO | WO 2006072604 A2 * | 7/2006 |

* cited by examiner

*Primary Examiner* — William P Watkins, III
(74) *Attorney, Agent, or Firm* — Roberts Mlotkowski Safran & Cole, P.C.; David S. Safran

(57) ABSTRACT

A vapor-permeable laminate (1) with at least one first outer layer (2) and at least one second outer layer (3), the outer layers (2, 3) having perforations (4, 5) and being joined to one another in such a way that the perforations of the first outer layer (2) do not coincide with the perforations (5) of the second outer layer (3), and a structure (6) having pores (7) being provided between the outer layers (2, 3). In order to achieve sufficient vapor permeability with at the same time sufficient hydrostatic seal-tightness, it is provided that each of the pores (7) has a clear cross-sectional area (A) of less than 200 μm².

13 Claims, 14 Drawing Sheets

VAPOR-PERMEABLE LAMINATE

BACKGROUND OF THE INVENTION

1. Field of the Invention

The invention relates to a vapor-permeable laminate with at least one first outer layer and at least one second outer layer, the outer layers having perforations and being joined to one another in such a way that the perforations of the first outer layer do not coincide with the perforations of the second outer layer, and a structure having pores being provided between the outer layers.

2. Description of Related Art

Vapor-permeable laminates of the aforementioned type are microporous webs or sheets which are structured by their fine-pored configuration in such a way that vapor molecules can pass or diffuse through them in a controlled manner. Laminates of this kind, which are also referred to as diffusion-open membranes, are intended to ensure a breathable wall or roof structure in the construction industry. It is intended that excess moisture in the air of a room can be diffused out through the laminate in a controlled manner, in order to prevent problems, such as moisture damage in the region of the insulating layers located in the wall or roof structure. At the same time, it is intended that sufficient seal-tightness is ensured. It is a disadvantage of the laminates of the aforementioned kind that are known from practice that the mechanical properties and durability of these products are limited.

The application of vapor-permeable laminates of the aforementioned kind is not, however, restricted to the aforementioned use. Use is also possible in other areas in which, on the one hand, seal-tightness under exposure to liquids, and on the other hand vapor, permeability are required.

International Patent Application Publication WO 2006/072604 A2 already discloses a laminate of the aforementioned kind. In the case of this laminate, two microstructured and perforated sheets are joined to one another in such a way that the structured sides of the individual sheets lie opposite one another and the structures thereby run crosswise. The perforation holes in the individual planes of the sheets must not coincide with one another during lamination, since otherwise it is possible for liquid to pass directly through the laminate and the composite is consequently not seal-tight. In principle, it is intended here that the distance between the perforations in the two planes is of such a size that the diffusion path for gas to pass through is not too great, but there are enough barrier locations between the two perforations to effectively prevent moisture from passing through. In the case of this known laminate, it is provided for this purpose that the distance between the first and second outer layers, and consequently the channel height, should be less than 200 µm. To achieve seal-tightness under a static water column of 100 cm, the distance between the two outer layers, and consequently the channel height, must be 50 µm. If a lower level of seal-tightness is required, a greater distance between the outer layers can accordingly be realized. The individual figures of WO 2006/072604 A2 reveal that, in the best case, the channels have a width which is twice the channel height. Generally, the channel width is many times greater than the channel height.

Since the web described in WO 2006/072604 A2 does not exist in practice, the applicant has invested considerable effort in preparing test specimens of webs of this kind. Preparation of such specimens involves considerable effort particularly because webs with microstructures of this kind previously did not exist. It was also problematic for webs of this kind to be laminated in such a way that the channel structure is not adversely affected during the lamination, with the consequence that the microporosity and, as a result, the vapor permeability suffer. After preparing specimens, tests were carried out by the applicant to check the seal-tightness and vapor permeability. It was found during these tests that the laminates produced according to WO 2006/072604 A2 are sufficiently vapor-permeable, but exhibit passage of water through them, and consequently lack of seal-tightness, even under low static water columns of less than 20 cm.

SUMMARY OF THE INVENTION

Therefore, the present invention is based on the object of providing a vapor-permeable laminate of the kind mentioned at the beginning which, on the one hand, ensures sufficient seal-tightness with respect to water passing through, but on the other hand, offers adequate vapor permeability.

This object is achieved according to the invention substantially by the individual pores of the structure having, in each case, a clear cross-sectional area of less than 200 $\mu m^2$.

The basic concept of the present invention center is to place the porous structure of a diffusion-open laminate construction in the center plane between two outer layers. The porous structure, in this case, forms a functional plane. The outer layers have perforations or openings of dimensions that are large to very large in comparison with the dimensions of the pores of the functional plane. The perforations of the outer layers are arranged offset, so that moisture cannot pass directly through the layer structure. The function of the outer layers is primarily to improve the mechanical stability and robustness of the laminate. Furthermore, the outer layers generally have an absorbent or repellent effect with respect to external influences and so protect the middle functional plane. By way of example, mention may be made here of UV radiation or the kinetic energy of rain or water drops. It is of significance that the functional plane or the structure has a porosity transversely to the layer structure of the laminate, that is to say in the plane of the laminate. The pores are consequently so-called horizontal pores.

In this respect, the aforementioned cross-sectional area of the individual pores of less than 200 µm is the result of extremely painstaking investigations. As already stated above, for that reason alone, it was not readily possible to arrive at the cross-sectional area now found according to the invention, since no outer layers or sheets or films with microstructures of this kind are available in practice. They had to be prepared in one-off production and subsequently laminated in such a way that the microstructure was also retained after the lamination. In addition, taking WO 2006/072604 A2 into consideration, the use of pores with such a small cross section did not appear to be obvious if only because it was initially feared that, although reducing the size of the pore cross section would increase the seal-tightness of the laminate, if overdone it would impair or even nullify the vapor permeability. It was then surprisingly found, however, after carrying out a series of tests with webs of different pore cross sections, that the cross-sectional area range of a pore of the present invention, on the one hand, offers sufficient seal-tightness, and on the other hand, does not restrict the vapor permeability. In the tests carried out, seal-tightness (according to EN 1931/EN 12572, 23° C., 70% relative humidity) of more than 400 g/$m^2$d was, in each case, found under a static water column of over 200 mm for cross-sectional areas of slightly less than 200 $\mu m^2$.

In the tests, which were carried out by the applicant, it was also found that the individual pores should, in each case, have a clear cross-sectional area of less than 150 $\mu m^2$, preferably less than 100 μm², and in particular, in the range between 0.5 μm² and 50 μm². With such small cross-sectional areas, seal-tightness is respectively obtained under a static water column of more than 400 mm and, in particular, more than 600 mm. Even with the aforementioned small pore cross sections, the water vapor permeability is still well above 100 g/m²d.

It is preferred, in this respect, that the structure should have a porosity transversely to the layer structure.

It is also preferred that the average opening width of the pores is less, preferably very much less, than the opening width of the perforation.

In principle, it is possible to form the structure as a functional plane by a separate layer and/or as part of at least one outer layer. Coming into consideration in particular for the structure as a functional plane are a foam layer or a porous fiber sheet between the outer layers, a channel structure formed on at least one outer layer, fibers located between the outer layers, which fibers may be prefabricated or sprayed on, or else a functional layer of structured adhesive.

Depending on the form of the functional layer, the structure has various forms. In the case of a foamed functional layer, the pores of the structure substantially have an elliptical, in particular, circular form. The same applies in the case of a porous sheet. A porous stretched sheet has substantially elliptical pores. If the channel structure is provided on at least the inner side of the outer layers facing one another, the individual channels are formed between lateral lands, which laterally delimit individual channels. In this case, the clear cross-sectional area is then determined by the area which is enclosed by the underside of the channel, the side faces of the lands and the imaginary joining line between the two upper sides of the lands. In this case, the side faces of the lands may be of a straight, concave or convex form. The same also applies, moreover, if the structure, and consequently the functional plane, is formed by fibers or by structured adhesive. The use of a foamed functional plane offers the major advantage that the outer layers, which are favorably unstructured, can be joined to one another exclusively by the foam, it being possible for the inner sides that are facing one another to be corona-, plasma- or primer-pretreated to improve adhesion. The advantage here is that the foam ultimately forms the adhesive, so that substantially full-area contact with the two outer layers is obtained. Moreover, the size of the (horizontal) pores of the foam can be controlled very well by way of the process parameters such as foam formation and temperature as well as pressure during the lamination. In this connection, it is particularly suitable if the foam is obtained by expanding an emulsion or dispersion, in particular a water-based emulsion or dispersion.

In the case of a preferred embodiment, it is provided that the outer layers are joined to one another exclusively by foam.

In tests, it has been found that the foam arranged between the outer layers, that is to say after the laminar structure has been produced, should have a dry weight of between 2 g/m² and 200 g/m² and, in particular, between 10 g/m² and 40 g/m².

As stated above, the structure may be formed as a functional plane and by at least one porous sheet. The porous sheet is produced, in particular, from a highly filled sheet by stretching. The filling of the sheet may, in this case, preferably be more than 20% by weight, with preference more than 40% by weight, of the total weight of the sheet. The filling should comprise particles, such as, for example, chalk and/or furnace carbon black, with an average particle diameter of between 0.5 μm and 50 μm, the carbon black particularly also contributing to the stabilization of the sheet. The stretching produces the pores, it being possible for the porous sheet itself to have a low layer thickness with a weight of between 2 g/m² and 200 g/m².

As mentioned above, the pores may also be formed by channels provided on the inside of at least one outer layer, the channels then representing corresponding clearances on the inner side of the respective outer layer, so that the individual channels are delimited from one another by lateral lands. It has been found by the applicant, in this connection, that, taking into consideration the maximum channel cross-sectional area according to the invention, the width/depth ratio of the channel must not go above or below certain values in order to prevent collapsing. It goes without saying that the statements made below concerning the width/depth ratios can be correspondingly applied in the case of elliptical pores or pores of any other form. In the case of elliptical pores, the semimajor axis of the ellipse then corresponds to the width of the channel and the semiminor axis of the ellipse corresponds to the depth of the channel.

Taking into consideration the aforementioned maximum pore cross-sectional area, the width/depth ratio of the channel should lie between 10:1 and 1:10. However, ratios of between 5:1 and 1:5, and in particular, between 2:1 and 1:2, are preferred. In this respect, the maximum width of the channel should preferably be less than 150 μm, while the maximum depth of the channel should not exceed 50 μm.

It is preferred that the width and/or the depth of the channel is less than 25 μm, and in particular less than 20 μm. For a predetermined vapor permeability and seal-tightness, the exact dimension of individual channels, that is to say the cross-sectional area and length thereof, is ultimately dependent on the surface tension and the form of the outer layer or the entire laminate (hydrophilic or hydrophobic), the drop size, the polarity of the fluid and further parameters.

Furthermore, if the channel structure is formed between the outer layers, it should be ensured that the lands forming the channel structure, between which the channels are located, have planar upper sides. The presence of planar upper sides of the lands makes it possible to ensure during the lamination of the two outer layers that a good and secure join is obtained between the two outer layers, which is important for achieving the necessary seal-tightness of the laminate. Moreover, the lands may have both straight and sloping or curved flanks—as the result of different production processes. However, as found by the applicant, the morphology of the side faces of the lands and of the channel otherwise has no influence on the functionality of the laminate. At least substantially, the channel cross section mentioned is ultimately decisive for the desired function.

In the case of the laminate according to the invention, it is thus preferred that a seal-tightness is provided under a static water column of at least 200 mm, preferably at least 400 mm, and in particular more than 600 mm. Furthermore, in the case of a preferred embodiment, a vapor permeability (EN 1931/EN 12572, 23° C., 70% relative humidity) of at least 100 g/m²d, preferably of more than 200 g/m²d and in particular of more than 400 g/m²d, is provided.

In the case of a preferred embodiment of the present invention, a channel structure is provided both on the first outer layer and on the second outer layer. In the laminated state, the channel structures are on the surfaces facing one another. It is important in this connection that the channels of the first outer layer and the channels of the second outer layer do not lie directly over one another, but rather cross, in particular, at an angle of between 5° and 175°. The channels may, in this case, be both linear and angled or bent on the surface of the individual outer layers, with preference running parallel to one another on an outer layer. All that is decisive is that the channels of the two outer layers in the laminate do not lie congruently over one another, but cross instead. It is pointed out that, in the case of jagged or bent structures, angles of from 0° to 180° are also possible in principle. A precondition is that the crossing of the channels of the first outer layer and the channels of the second outer layer produces so-called channel locations, passage locations and joining locations. A channel location is, in this case, a crossing point between a channel of one outer layer and a land of another outer layer. A passage location is a crossing point between a channel of the one outer layer and a channel of the other outer layer. Finally, a joining location is a crossing point between a land of the one outer layer and a land of the other outer layer. Individual channels should have such a length that at least one channel location and one passage location for a channel are obtained in the laminate. In the upward direction, the length of a channel or channel portion is not limited apart from by the perforations.

In the case of outer layers structured on both sides, it is preferred that the ratio of the channel width to the land width lies between 2:1 and 1:10, preferably between 1:3 and 1:5. In this case, the proportion of the total surface area made up by the channel locations is at least 25%, preferably at least 32%, and in particular, it lies between 35% and 50%. The proportion of the total surface area made up by the passage locations is at least 2%, preferably at least 5%, and in particular, lies between 6 and 12%. Finally, the proportion of the total surface area made up by the joining locations is at least 25%, preferably at least 30%, and lies in particular between 35 and 60%.

In the following table, the proportions of joining locations, passage locations and channel locations are given as a percentage, in each case per unit area (UA) for various channel/land width ratios.

| Channel/land width ratio | Proportion of joining locations/ UA [%] | Proportion of passage locations/ UA [%] | Proportion of channel locations/ UA [%] |
| --- | --- | --- | --- |
| 1:1 | 25 | 25 | 50 |
| 1:2 | 44.45 | 11.1 | 44.45 |
| 1:3 | 56.25 | 6.25 | 37.5 |
| 1:4 | 64 | 4 | 32 |
| 1:5 | 70 | 3 | 27 |

Moreover, it is pointed out that the individual channel structures in the respective outer layers or sheets do not have to be identical, apart from the alignment of the channel structures. All that is important is that there is a sufficient proportion of channel locations, passage locations and joining locations of the appropriate dimensions to ensure the functionality of the laminate according to the invention.

Instead of the use of outer layers or films which each have a microstructuring or channel structuring, it is also possible for only one outer layer to have a channel structure, however then with crossed channels, the channels crossing at an angle of between 5° and 175°. In an extreme case, these are simply interrupted channels in one direction. In this case, it is favorable if the other outer layer is unstructured, even if, in principle, the channel structure may likewise be provided. The use of an unstructured outer layer is, however, particularly simple and inexpensive for this case, especially since the unstructured outer layer may have an adhesive on its side facing the structured outer layer, which makes lamination easier. If an outer layer with a channel structure with crossed channels and an unstructured outer layer are used, only channel locations and joining locations are obtained. In this case, there are no passage locations. Here, the proportion of channel locations per unit area corresponds to the sum of channel and passage locations of the previously described embodiment with two structured outer layers/sheets. It may, moreover, then be the case here that the ratio of the channel width to the land width lies between 2:1 and 1:20, preferably between 1:2 and 1:10. The proportion of the total surface area made up by the channel locations is, with preference, at least 27%, preferably at least 36%, and lies with preference between 45 and 50%. The proportion of the total surface area made up by the joining locations is at least 25%, preferably at least 30%, and lies in particular between 45 and 55%.

To ensure sufficient seal-tightness, on the one hand, and the necessary vapor permeability and intrinsic stability of the laminate, on the other hand, it has also been found in the course of tests that the proportion of the total surface area of the outer layer that is provided with perforations may be between 1 and 25%. The greater this proportion is, the more open the individual sheet or outer sheet is to diffusion, but the mechanical stability of the laminate suffers.

It is favorable in this connection that 0.5 to 100 perforations per $cm^2$ are provided. Preferred are 5 to 50 perforations per $cm^2$. The perforations may be both round holes and slits. Oval perforations or other geometries are also possible. Specifically when forming a channel structure on the outer layers, it is important that the formation of the holes or slits takes place in such a way that no additional structures that exceed or disturb the dimensions of the channel structures occur on the microstructured side of the outer layer concerned.

A known technique for the preparation of sheets is that of needle perforation. In the case of this technique, holes are continuously made in the sheet by means of needles attached to rollers. This process may be carried out both with cold needle segments and with heated needle segments. In the case of cold perforation, it must be ensured that, when the needle penetrates, the cold material of the sheet or outer layer forms a funnel, which should be located on the smooth, non-structured side of the sheet in order to ensure the functionality of the outer layer. In the case of hot-needle perforation, it must be ensured that, when the needle pierces the sheet, a so-called melt edge is obtained, and this may exceed the dimensions of the microstructure. Therefore, it should also be ensured here that the sheet is perforated by the hot needle in such a way that the melt edge is obtained as far as possible on the side of the outer layer that is facing away from the structured side of the sheet.

Moreover, the perforations may also be punched. Punching does not cause any troublesome edges around the perforations, and so no undesired locations are obtained. In addition, contactless perforation methods are also possible, for example by means of high-energy laser radiation, high-pressure water jetting or by means of high-voltage discharges. Independently of the perforation method, the perforations should, even if they are formed as slits, have a length of between 0.5 mm and 20 mm, while in the case of round perforations the diameter per perforation should lie between 15 μm and 1500 μm.

Furthermore, to achieve sufficient seal-tightness, it has been found that at least one, preferably two, and in particular five, channel locations should lie between a perforation of the first outer layer and the next perforation of the second outer layer, a channel location being delimited by two crossing locations or two passage locations.

Furthermore, it has been found that the seal-tightness of the laminate can be further increased if the channels are provided with a raised substructure. The dimension thereof is at most one fifth of the smallest channel dimension and, with preference, at most one tenth. These may be grooves of any desired angle in relation to the preferential direction of the channel. Nub-shaped or roughened structures are also suitable. The substructure allows the use of larger primary structures with the same seal-tightness result or allows the seal-tightness to be increased with the same primary dimension.

The material of the individual outer layers or sheets is, with preference, amorphous and crystalline, preferably thermoplastic materials, such as for example polyolefins (polypropylene as a homopolymer, copolymer or block copolymer and polyethylene), polyamides, polyesters, polyurethanes, polystyrenes, PVC, bioplastics, etc., blends of the aforementioned plastics, compounds or batches. However, other polymers such as elastomers, resins or dispersions may also be used. Furthermore, the aforementioned plastics and polymers may contain various stabilizers (for example thermal or UV stabilizers), fillers and/or other functional additives such as pigments, flame retardants or the like. Furthermore, pre-laminates of sheets and reinforcements such as nonwovens, laid or lattice structures may be used. The forming of the laminate according to the invention from inorganic sheets, such as for example ceramic, is also conceivable.

The seal-tightness of the laminate with respect to water can be further increased by using hydrophobic materials. This applies in particular to the surface of the channels. This is achieved by choosing the suitable base materials or by subsequent treatment of the outer layers and/or the laminate with liquid or gaseous hydrophobing agents.

The weights per unit area of the individual outer layers lie between 3 and 1200 $g/m^2$. With preference, 7-100 $g/m^2$, and in particular 10-50 $g/m^2$, are used. The thickness of the outer layers lies between 2 and 1500 μm, including the structure, even if the latter is provided as a separate functional layer, such as for example as a foam layer or a separate porous sheet layer. With preference, the thickness of the layers including the functional layer lies between 8 and 100 μm, and in particular between 12 and 45 μm.

However, the present invention not only relates to the aforementioned laminate as such, but also to methods for producing such a laminate. However, it is expressly pointed out that the invention is not restricted to the production of laminates with the aforementioned cross-sectional dimensions of the pores, but can in principle also be used in the case of outer layers or sheets to be laminated with a structure having pores lying in between as a functional plane with greater cross-sectional dimensions, even if the methods specified below are particularly suitable for producing the laminate according to the invention.

Various methods for producing vapor-permeable laminates of the aforementioned type, are described below. In the case of a first alternative according to the invention, an outer layer is coated on one side (inner side) with open foam, a further outer layer then being applied to the foam. The foam itself has, by way of its (horizontal) pores, a porosity transversely to the layer structure, that is to say aligned in the laminate plane. The dimensions of the horizontal pores correspond with preference to those given at the beginning. This method offers a series of advantages, since unstructured outer layers with a perforation produced in any way desired can be used. In particular in the case of inner sides of the outer layers that are pretreated to improve adhesion, full-area contact of the outer layers with the foam can be achieved, it being possible to control the size of the horizontal pores, and consequently the vapor permeability, by way of various process parameters during the production, such as for example foam formation, temperature and pressure.

It is provided with preference in the case of the aforementioned method that the foam applied to the outer layer is pre-dried for a predetermined time interval at a temperature greater than 40° C. Moreover, it should be provided with preference that, after applying the second outer layer, the laminar structure is calendered at a temperature greater than 40° C. and a pressure of greater than 100 N/cm.

Furthermore, according to the method, it may be provided with preference that, after the calendering, the laminar structure is fixed for a predetermined time interval at a temperature greater than 40° C.

In the case of an alternative embodiment of the method according to the invention, a porous sheet is used, laminated between two outer layers that are, with preference, unstructured and have a perforation produced in any way desired. The inner sides of these outer layers facing one another may also be pretreated to improve adhesion, as stated above. The porous sheet is produced as a functional plane by stretching, a highly filled sheet being used with preference as the starting material. With preference, the sheet is stretched monoaxially by a factor of at least 1.2. In the case of this embodiment, the lamination preferably takes place using spray adhesives, which are provided in particular between the respective side of the functional plane and the outer layer.

In the case of another alternative according to the invention, a melt film is extruded onto at least one microstructured casting roller to produce the outer layer for a vapor-permeable laminate, the microstructure of the casting roller being replicated in the melt film as a channel structure. The channel structure is fixed in the outer layer produced, with preference by cooling down the melt film. The outer layer may then be perforated before joining to the further outer layer and, after perforation, be laminated with the further outer layer, which may likewise be already perforated or else only perforated later. The further outer layer may have been produced in a way corresponding to the first outer layer and accordingly likewise have a channel structure. However, it is also possible for the further outer layer to be unstructured. In this case, the channel structure of the first outer layer then has a channel structure with crossed channels.

In the case of another alternative method according to the invention, it is provided that a channel structure is impressed into one outer layer by means of a microstructured embossing roller and that the outer layer is then laminated with a further outer layer. Here, too, the further outer layer may be provided with a corresponding channel structure or else be unstructured. In order in this connection to replicate the microstructure of the embossing roller completely in the outer layer, it is suitable for the outer layer to be heated before embossing, to be precise in particular up to the melting range, while the embossing roller should be cooled. Here it is then suitable for the outer layer to be already perforated before the embossing. The advantage of this is that possible inhomogeneities in the thickness, in particular in the peripheral region of the perforations, can be evened out.

It has, moreover, surprisingly been found during the structuring of the outer layers that the joining to other additional layers, such as for example reinforcing layers, is possible during or before the structuring process and the structuring is nevertheless successful. For example, extrusion coating may take place on the structured casting roller, the structure being cast with adequate accuracy. It is also possible for an additional layer to be provided in or before the structuring process by embossing. The additional layer is in all cases arranged on the side that is not to be structured. Possible additional layers are, for example, the reinforcements mentioned above with respect to the pre-laminates.

In principle, it is possible for the individual sheets or outer layers to be laminated to one another thermally. In this case, the sheets are then passed over rollers, one or both sheets being heated, in particular on the microstructured channel side, by means of heated rollers or hot air up to the melting point and subsequently joined to one another by means of a calender. In the case of a laminate obtained in this way, the sheets are ideally joined to one another at all the crossing points of the lands (joining locations). Depending on the widths of the channels and the ratio of channel width to land width, the proportion of the total surface area made up by the joining surface area already mentioned above is then obtained. It is important to note that, during the thermal lamination, the channel structure may be closed by incipient melting and excessive pressure. However, too low a temperature and too little pressure in the process do not cause the two sheet planes to be joined with a well-formed and complete connection. To achieve the desired dimensions of the channel structure, suitable choice of the parameters pressure and temperature must therefore be ensured. Here it is appropriate in particular to exploit the possibility of influencing the dimension of the channel-location cross sections by the extent to which the lands sink into one another when the outer layers are structured on both sides or the extent to which the lands of the structured outer layer sink into the unstructured outer layer. In connection with thermal lamination, it may be particularly preferred to provide ultrasonic welding in addition to the thermal lamination.

Apart from thermal lamination, lamination by adhesive bonding also comes into consideration, that is to say in particular by so-called curtain coating adhesive bonding by means of roller application systems application of adhesives by spraying.

In the case of curtain coating, a continuous, very thin adhesive film with layer thicknesses of less than 10 µm, better less than 5 µm, and with preference less than 3 µm, is applied to one of the two sheets. This film forms a coating over the entire surface of the sheet, so that the channel structure is preserved. The layer thickness and the properties of the adhesive should in this case be chosen with preference such that the adhesive film tears open of its own accord in the perforation holes, so that the perforation remains open.

In the case of adhesive bonding by means of roller application systems, very thin adhesive films can likewise be applied. Here, both adhesives that contain solvents and adhesives that are free from solvents can be used. In the case of certain materials, in particular pure polyolefin sheets, a corona, plasma or primer pre-treatment should be provided in advance for better surface wetting. By contrast with curtain coating, during roller application preferably only the raised lands, that is to say the upper sides thereof, are wetted with adhesive, while the channels remain free from adhesive, that is to say no adhesive should get into the channels. Moreover, in the case of this method, the perforation in the form of holes or slits is less susceptible to partial or complete closure.

In the case of an independent refinement according to the invention, in which adhesive bonding by means of roller application systems likewise takes place, it is provided that an unstructured outer layer is laminated with a further unstructured outer layer by means of an adhesive, the adhesive being applied to at least one outer layer, in particular printed on, as a channel structure with lands and channels lying in between. The adhesive as such then performs a dual function, that is on the one hand the adhering or joining function and on the other hand the structuring by way of the adhesive itself. It goes without saying in this connection that correspondingly structured rollers are provided for applying the adhesive to the sheets. The dimensions correspond to those described above.

Alternatively, it is possible to spray adhesives onto the outer layers. In this case it is then preferred to use a spray adhesive or aerosols of adhesive emulsions/suspensions. The use of suitable nozzles allows adhesive droplets or threads with correspondingly small dimensions to be produced, suitable both for the adhesive bonding of the two sheets and the forming of the channel structure. The adhesive threads or particles must in this case be around the same size as the channel or land dimensions mentioned at the beginning, so as to produce between the lands of adhesive channels which ensure the function of the laminate according to the invention.

It also goes without saying that the application of adhesives by spray application can only be used for the purpose of applying the adhesive to the channel structure, without the additional function of the microstructuring being brought about by the adhesive itself.

In the case of an alternative embodiment, it is provided that a melt film is extruded to produce an unstructured outer layer and fiber material is fed to the melt film and incorporated in it to produce a channel structure, the fibers then being formed and arranged in such a way as to obtain the necessary channel structure with lands and channels, in particular with the dimensions mentioned above. The outer layer microstructured by way of the fiber material is then laminated with a further structured or unstructured outer layer. It is preferred in the case of this method that the outer layer microstructured by the fiber material is thermally laminated with the further outer layer in such a way that only the outer surface of the fiber material is incipiently melted, while the channel structure is substantially preserved.

Moreover, it may be provided in the case of all the aforementioned methods that at least one outer layer is corona-, plasma- or primer-pretreated on the side facing the structure.

In connection with the perforation, it may be provided in the case of all the aforementioned methods that the perforation of the outer layers takes place by mechanical methods, in particular slitting, hot-needle perforation, cold perforation or punching, water jetting or contactless methods, in particular by means of high-energy radiation or high-voltage discharge.

Moreover, all the aforementioned methods may also be applied to coex sheets. These have the advantage of allowing the use of a seal layer, which has a low melting point, and consequently the sheet does not have to be heated up too much. A further advantage is that the seal layer is co-structured. It is also possible by the thickness of the seal layer to control exactly the extent of the cross section of the channel locations that is reduced by the lamination with respect to the unjoined initial state.

The present invention also relates, moreover, to the apparatuses for carrying out the aforementioned methods for producing the laminates mentioned as well as the outer layers for these laminates, insofar as the outer layers are correspondingly structured.

It is expressly pointed out that all the intervals and ranges mentioned above and specified in the claims comprise all of the individual values that lie within the respective range or interval, including all decimal places, and that all of these individual values are regarded as essential for the invention, even if they are not specifically stated. The statement "less than 200 µm$^2$", for example, therefore comprises the values 199, 198, 197, . . . , 3, 2, 1, including all decimal places.

Exemplary embodiments of the invention are explained below with reference to the drawing, in which:

DETAILED DESCRIPTION OF THE INVENTION

Figure 1:
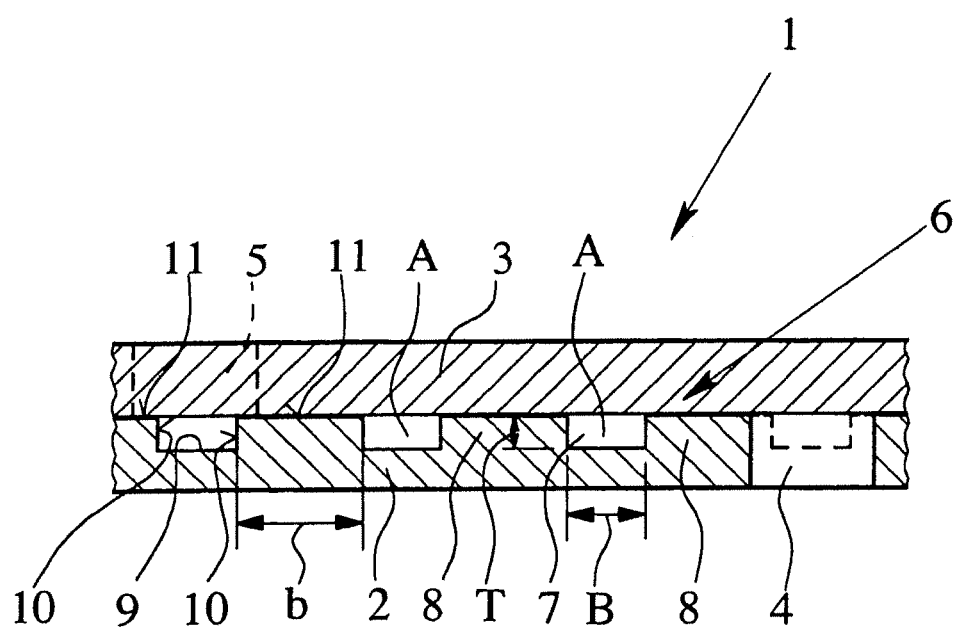
FIG. 1 shows a cross-sectional view of an embodiment of a laminate according to the invention.

Shown and described is a laminate 1, which is permeable to vapor and seal-tight with respect to liquid passing through, at least under low static water columns, and has in the case of the individual embodiments described and shown a first outer layer 2 and a second outer layer 3. The outer layers 2, 3 are sheets of thermoplastic material. The outer layers 2, 3 may, in principle, be multilayered, in particular they may be coex sheets, even if this is not specifically shown. It also goes without saying that, in principle, further permeable outer layers may also be provided.

A multiplicity of perforations 4, 5 are provided in each of the outer layers 2, 3 shown in FIGS. 1 to 15. Moreover, the two outer layers 2, 3 are joined to one another in such a way that the perforations 4 of the first outer layer 2 do not coincide with the perforations 5 of the second outer layer 3. They do not even partially coincide. Moreover, a macroporous structure 6 with a multiplicity of pores 7 is provided between the outer layers 2, 3. The structure 6 ultimately represents a functional plane in which, by way of the pores 7, which are ultimately horizontal pores, there is a porosity transversely to the layer structure, that is to say in the layer plane. The embodiments of FIGS. 1 to 14 as well as 15 and 16 differ in this respect, since the structure and the pores are in each case differently formed there. In the case of the embodiments according to FIGS. 1 to 14, the functional planes are provided in each case on at least one inner side, partly also on both inner sides facing one another, of the outer layers 2, 3. The pores 7 are in this case formed by channels. Each of the channels is delimited by lateral lands 8 and, in the downward direction, by a channel base. In the case of the embodiment according to FIG. 15, on the other hand, the structure 6 is formed by a foam layer, the pores 7 being located in the foam and the horizontal porosity being ensured as a result. In the case of the embodiment according to FIG. 16, the structure 6 is formed by a stretched, highly filled sheet 6, in which the pores 7 are located within the structure 6 or the stretched sheet.

It is important that the pores 7 have in each case an average clear cross-sectional area A which is less than $200\,\mu m^2$. In this respect, the cross-sectional area A in the case of the embodiments of FIGS. 1 to 14 is defined by the channel base 9, the side faces 10 of the adjacent lands 8, between which the respective channel is arranged, and the joining line between the upper sides 11 of adjacent lands 8. In this respect, the upper sides 11 are in each case preferably planar. In the case of the embodiment according to FIG. 15, the pores 7 have a circular form; in the case of the embodiment according to FIG. 16, they tend to have an elliptical cross-sectional form.

Figure 2:
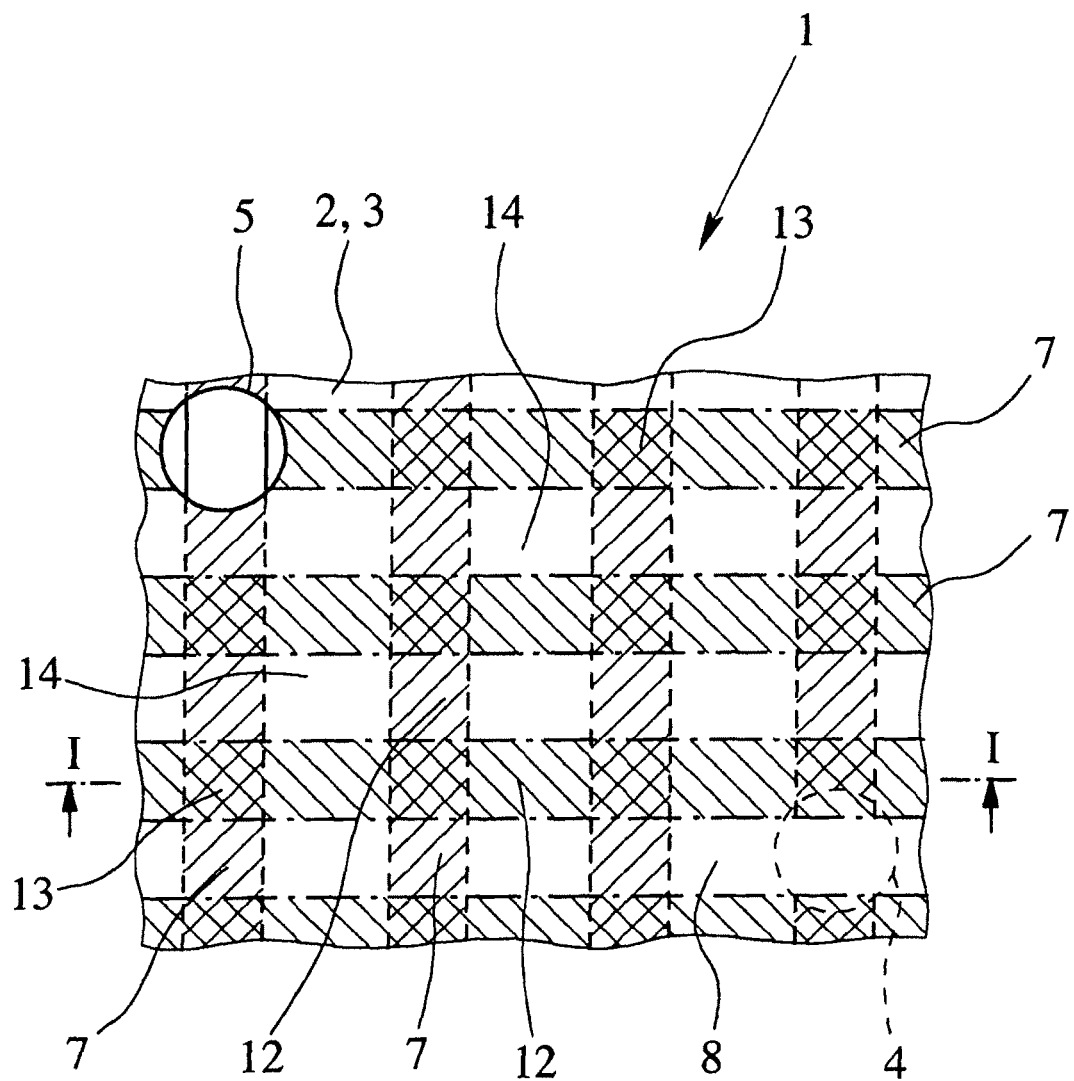
FIG. 2 shows a plan view of an embodiment of a laminate according to the invention.

Shown in FIG. 2 is an embodiment of a laminate 1 in which both the first outer layer 2 and the second outer layer 3 have in each case a channel structure on sides facing one another. The two outer layers 2, 3 are joined to one another on the inner sides having the channel structures. In FIG. 2, the lower, first outer layer 2 has longitudinally running channels as pores 7, which are hatched. The upper, second outer layer 3 has transversely running channels, which are likewise hatched. In the first outer layer 2 there is a circular perforation 4, while in the second outer layer 3 there is a further perforation 5, offset in relation to the perforation 4. The channels of the two outer layers 2, 3 are in the present case arranged at right angles to one another, which however does not necessarily have to be the case. Ultimately, all that is required is for the individual channels of the two outer layers 2, 3 to cross.

The crossing of the channel structures in the two outer layers 2, 3 produces hatched channel locations 12, cross-hatched passage locations 13 and unhatched joining locations 14. As FIG. 2 reveals, a channel location 12 is a crossing point between a channel of the first outer layer 2 and a land 8 of the other outer layer 3. A passage location 13, in the case of which passing through from one outer layer plane into the other outer layer plane is possible, is a crossing point between a channel of one outer layer and a channel 7 of the other outer layer 3. Finally, a joining location 14 is a crossing point between a land 8 of the first outer layer 2 and a land 8 of the second outer layer 3.

Apart from the cross-sectional area A, certain further dimensions and ratios should be maintained in the case of the laminate 1 in order to ensure the function according to the invention, that is to say sufficient seal-tightness with adequate vapor permeability, particularly well. Thus—with reference to FIG. 1—the cross-sectional area A should lie with preference between 5 and 150 μm² and the ratio of the width B to the depth T of the individual channels should lie with preference between 5:1 and 1:5. Furthermore, the width B and the depth T of the channels 7 should in each case preferably be less than 25 μm². Moreover, although not shown to scale in FIG. 2, the ratio of the width B of a channel 7 to the width b of a land 8 should lie with preference between 1:3 and 1:5.

Figure 3:
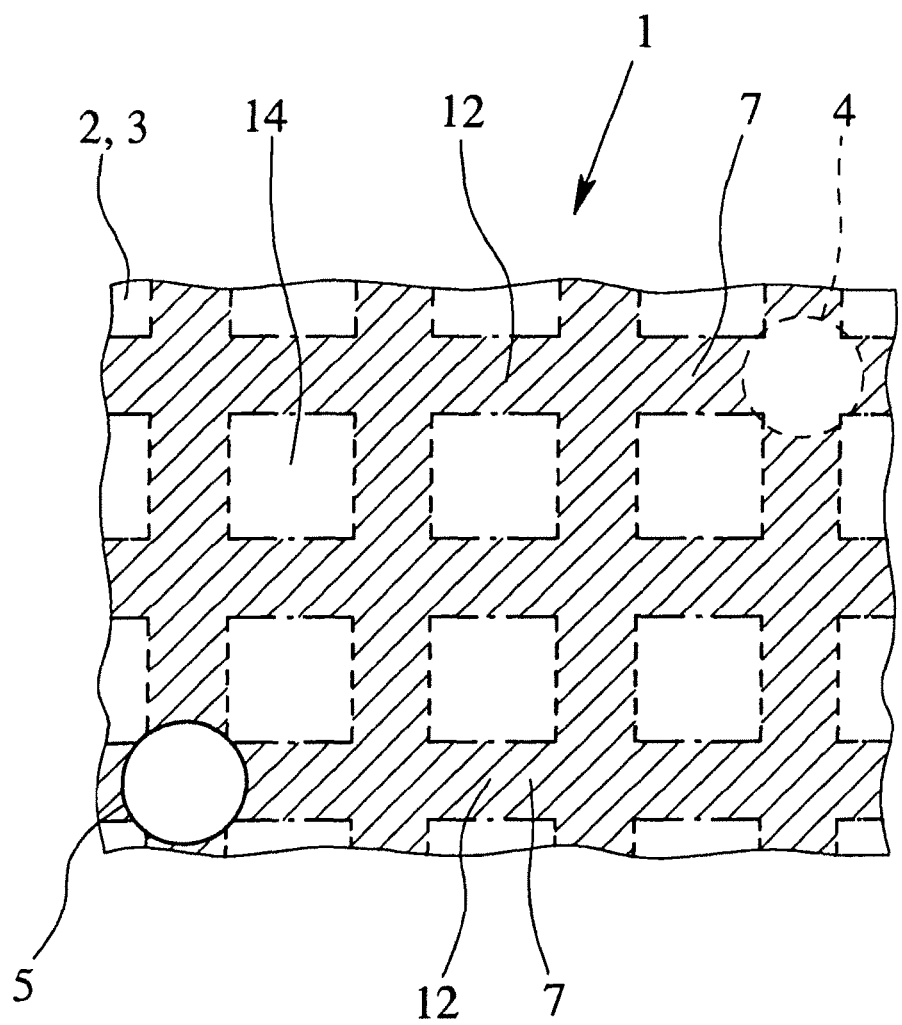
FIG. 3 shows a plan view of another embodiment of a laminate according to the invention.

Shown in FIG. 3 is a laminate 1 in which the lower first outer layer 2 has a channel structure with crossed channels. The channels in this case run at right angles to one another. The upper, second outer layer 3 is unstructured, therefore has no channel structure. However, the upper outer layer 3 has perforations 5, one of which is shown, while the first, lower outer layer 2 has perforations 4, one of which is represented by dashed lines. In the case of this embodiment, only channel locations 12, represented by dashed lines, and joining locations 14, shown unhatched, are obtained. By contrast with the embodiment according to FIG. 2, there are no passage locations 13. In the case of the embodiment according to FIG. 3, the crossing points between longitudinally and transversely running channels belong to the channel locations 12. Passing through from one layer plane into the next only takes place in the region of the perforations 4, 5.

Moreover, in the case of a laminate 1 with a crossed channel structure in the one outer layer 2 and an unstructured other outer layer 3, it is so that the ratio of the width B of a channel to the width b of a land 8 lies with preference between 1:2 and 1:10.

It is not shown in FIG. 3 that a layer with an adhesive may be provided on the unstructured outer layer, that is the outer layer 3, to be precise on the inner layer thereof that is facing the structured outer layer 2, in order to perform adhesive lamination.

In the case of the embodiment according to FIG. 2, in the most favorable case at least five channel locations 12 lie between the upper perforation 5 and the lower perforation 4 as the shortest distance. This high number of channel locations 12 produces on the one hand the seal-tightness and on the other hand sufficient permeability for vapor. Also in the case of the embodiment according to FIG. 3, in the most favorable case there are at least five channel locations 12 for the vapor to be able to pass from the one perforation 5 in the outer layer 3 to the next perforation 4 in the outer layer 1. A channel location 12 is obtained in the case of FIG. 3 by the length of a channel portion 12 between two crossing points, including the length of a crossing point.

Even if it is not evident from the individual representations, the proportion of the total surface area of the respective outer layer 2, 3 that is made up by the perforated surface area of the outer layers 2, 3 lies in each case between 1% and 25%, wherein between 0.5 and 100 perforations per cm² should be provided. While in FIGS. 1 to 3 and 13, for example, the perforations 4, 5 are formed as round holes, in the case of the embodiment according to FIG. 14 at least one outer layer 3 is provided with slits as perforations. The slits should in this case have a length of between 0.5 mm and 2 mm, while in the case of round perforations the diameter per perforation should lie between 15 and 1500 μm².

Figure 4:
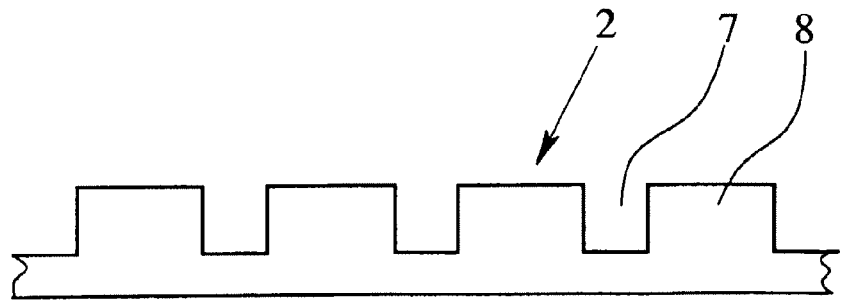
FIG. 4 shows a cross-sectional view of an outer layer for a laminate according to the invention.
Figure 5:
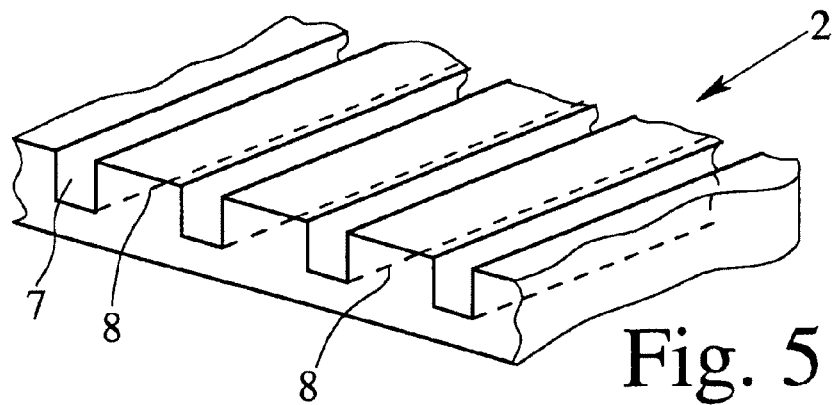
FIG. 5 shows a perspective view of the outer layer from FIG. 4.
Figure 6:
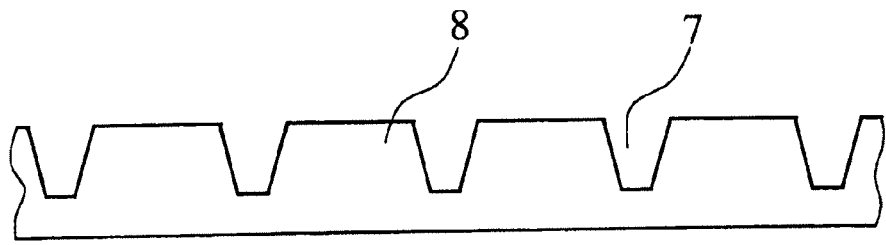
FIG. 6 shows a cross-sectional view of another outer layer for a laminate according to the invention.
Figure 7:
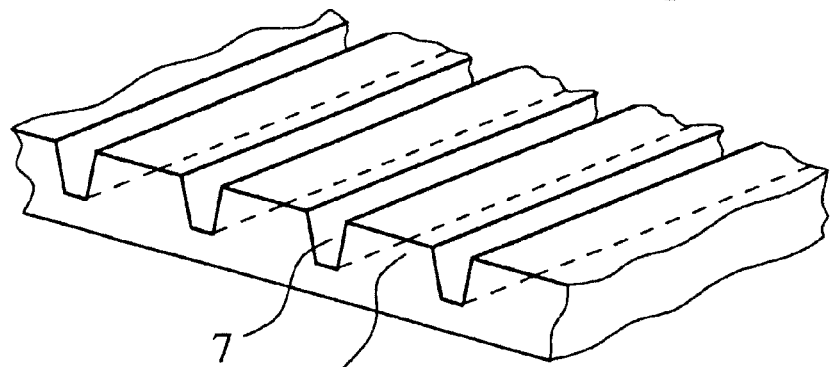
FIG. 7 shows a perspective view of the outer layer from FIG. 6.
Figure 8:
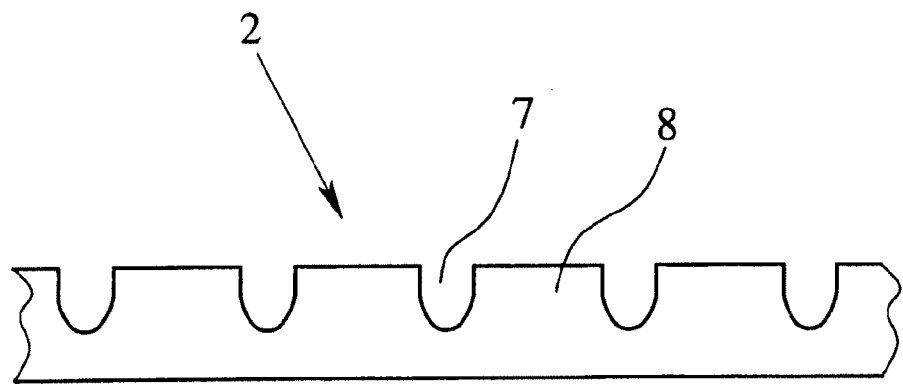
FIG. 8 shows a cross-sectional view of a further outer layer for a laminate according to the invention.
Figure 9:
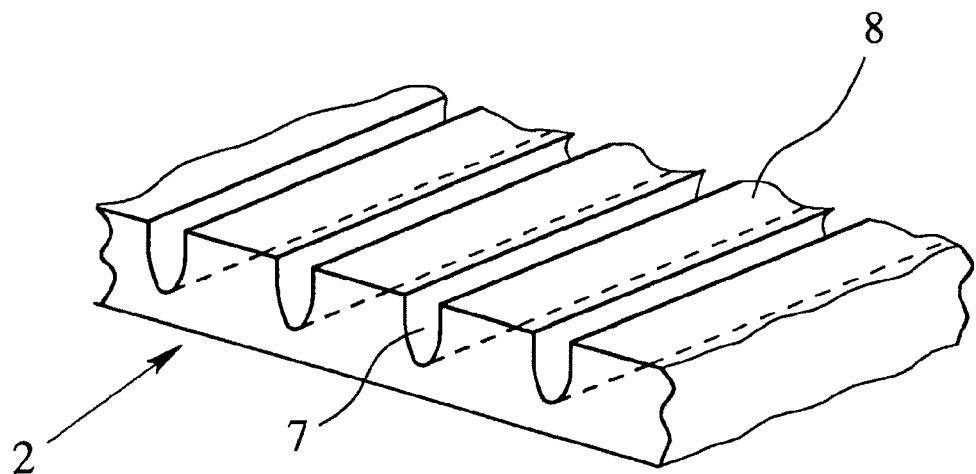
FIG. 9 shows a perspective view of the outer layer from FIG. 8.

In FIGS. 4 to 9, different forms of the channel structure or the channels and the lands 8 are shown. Rectangular channels which run parallel to one another are shown in FIGS. 4 and 5. V-shaped channels are shown in FIGS. 6 and 7, while U-shaped channels and correspondingly formed lands 8 are shown in FIGS. 8 and 9. The individual channels run in each case parallel to one another, which, in principle, is of course not required. If outer layers 2 such as those formed in FIGS. 4 to 9 are used, the second outer layer 3 should be correspondingly formed, crossing of the respective channels then being required.

Figure 10:
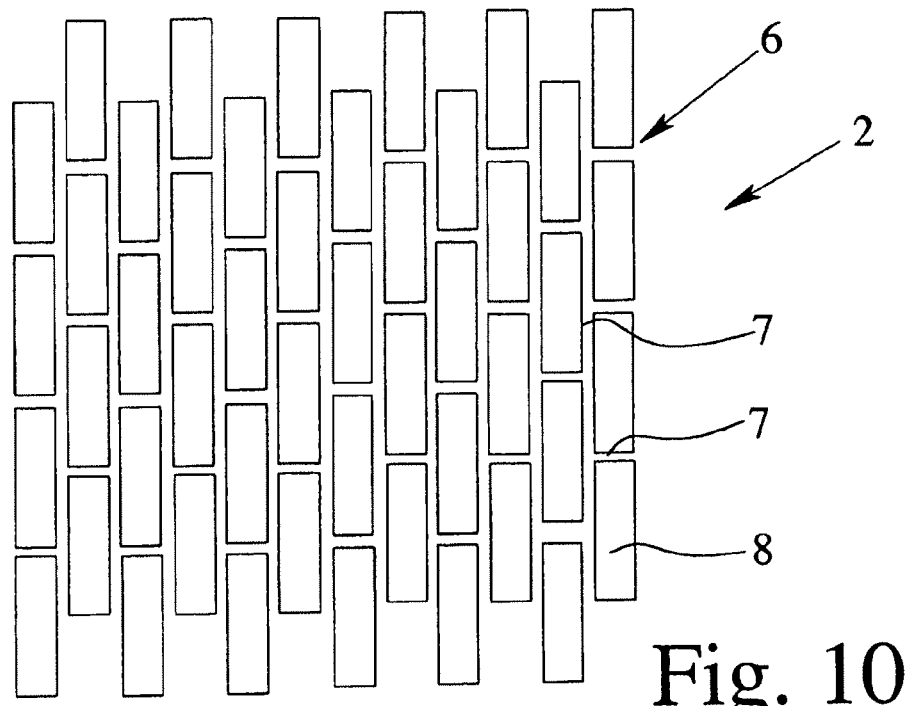
FIG. 10 shows a plan view of a further outer layer for a laminate according to the invention.
Figure 11:
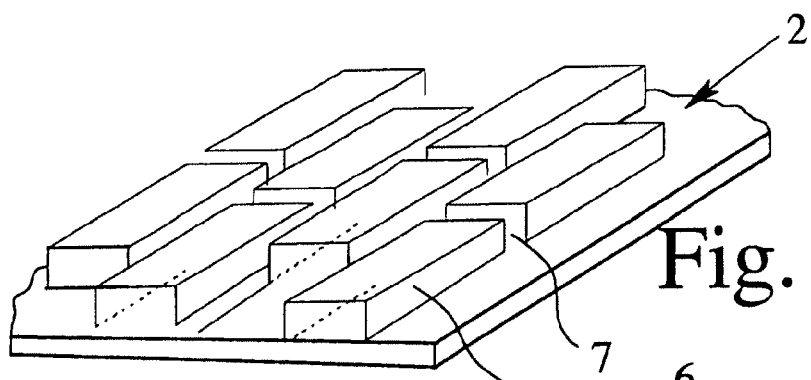
FIG. 11 shows a perspective view of the outer layer from FIG. 10.
Figure 12:
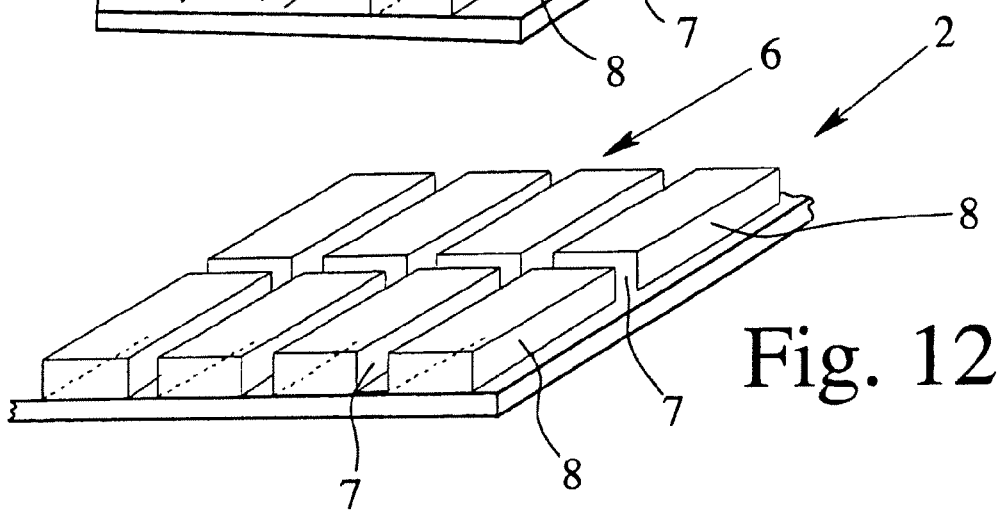
FIG. 12 shows a perspective view of another embodiment of an outer layer for a laminate according to the invention.

Shown in each of FIGS. 10 to 12 is an outer layer 2 in which a channel structure with crossed channels is provided. The channel structure 6 has in each case a tile structure. The individual tiles are obtained by channels which the lands 8 interrupt. The tiles are therefore portions of land. In the case of the embodiments of FIGS. 10 and 11, it is so in this respect that the tiles are arranged offset in relation to one another, while in FIG. 12 a uniform, non-offset arrangement is provided. The individual tiles have in this case a width of between 5 and 400 μm and a length of between 10 and 1000 μm. Both in the case of the longitudinally running channel locations 12 and in the case of the transversely running channel locations 12, the channel width B is in each case less than 150 μm.

Figure 13:
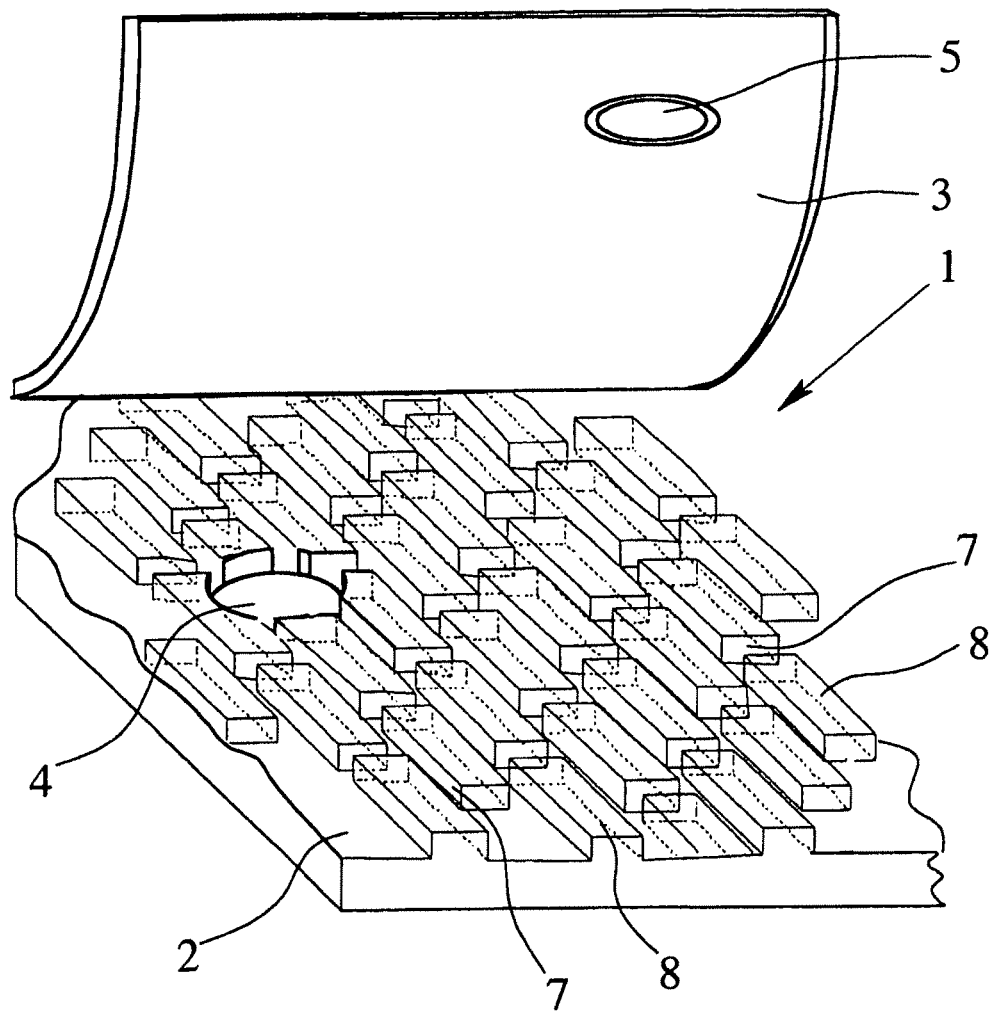
FIG. 13 shows a perspective view of part of a laminate according to the invention with the upper outer layer partly removed.

Shown in FIG. 13 is an embodiment in which an outer layer 2 such as that shown in FIG. 10 with an offset tile structure is used. The outer layer 2 has a multiplicity of perforations 4, only one of which is shown. The upper outer layer 3 is unstructured and has a multiplicity of perforations 5, only one of which is shown.

Figure 14:
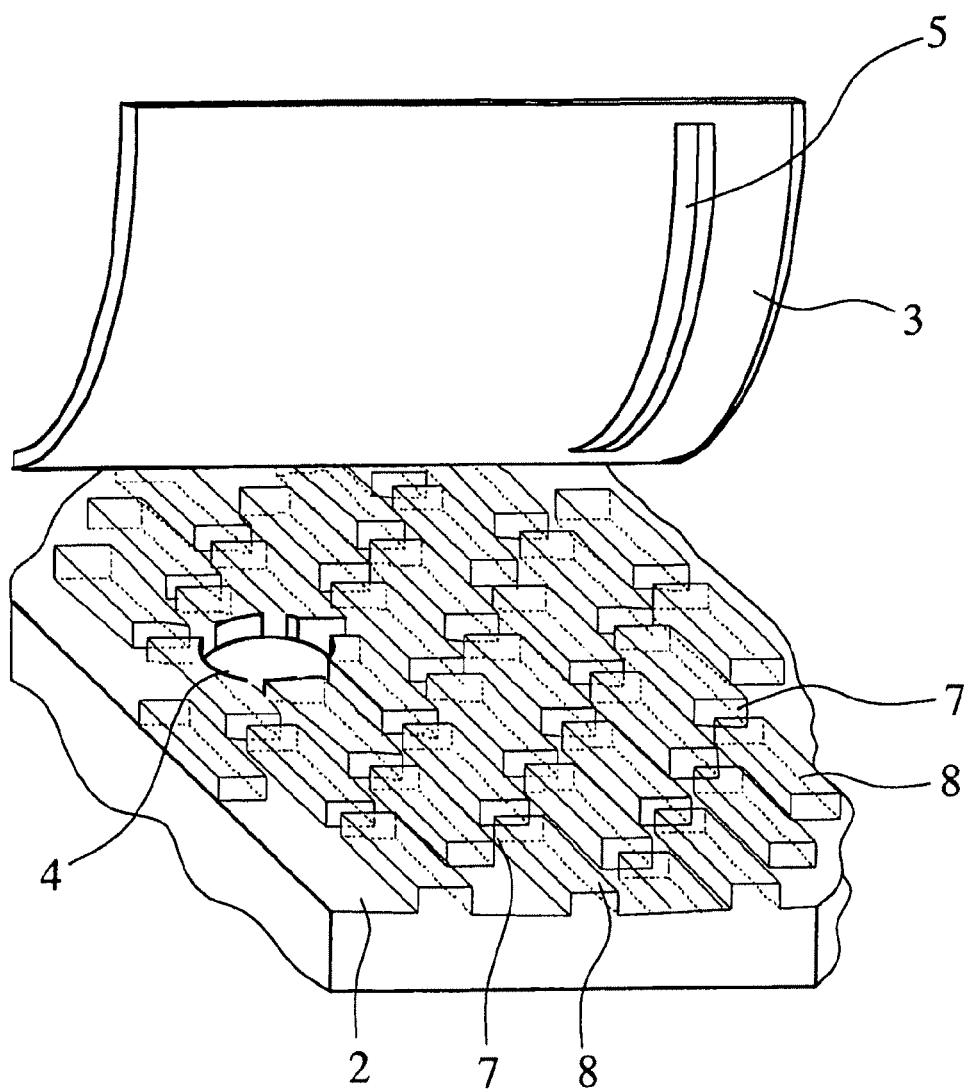
FIG. 14 shows a perspective view corresponding to FIG. 13 of another embodiment of a laminate according to the invention.

The embodiment shown in FIG. 14 differs from that shown in FIG. 13 in that the upper outer layer 3 does not have round holes as perforations 5 but slits. It goes without saying that, in principle, the lower outer layer 2 may also have slits instead of the round holes or in addition to round holes.

Figure 15:
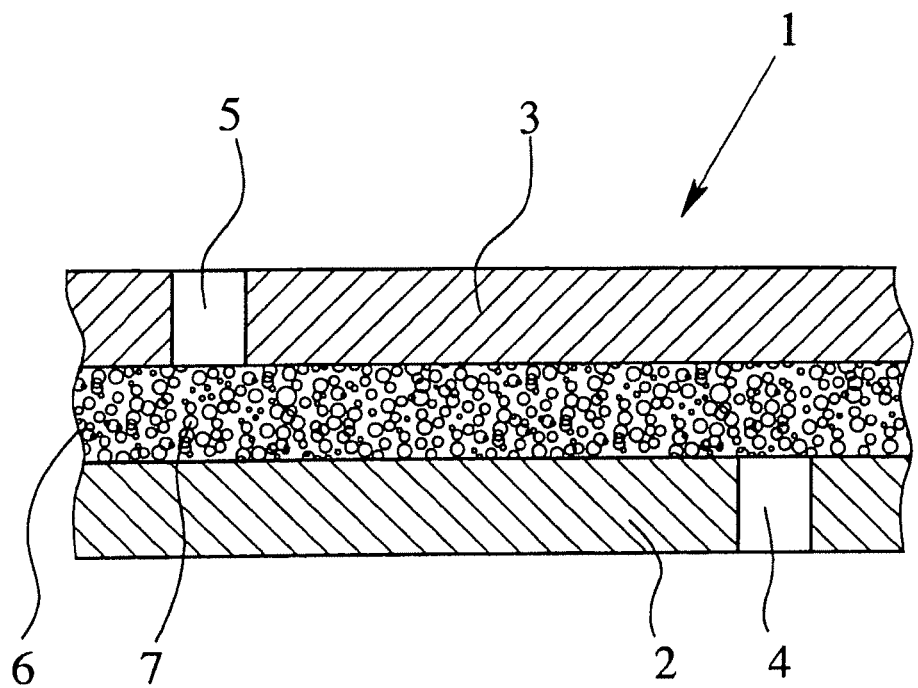
FIG. 15 shows a cross-sectional view of a further embodiment of a laminate according to the invention.

Shown in FIG. 15 is an embodiment of a laminate 1 in which there is a structure 6 of foam between the first outer layer 2 and the second outer layer 3. The foam has open pores 7 with the aforementioned dimensions. Since the foam is closed in the upward and downward directions by way of the outer layers 2, 3 (only the perforations 4, 5 are an exception to this here), a porosity transversely to the layer structure or in the plane of the laminate 1 is obtained.

Figure 16:
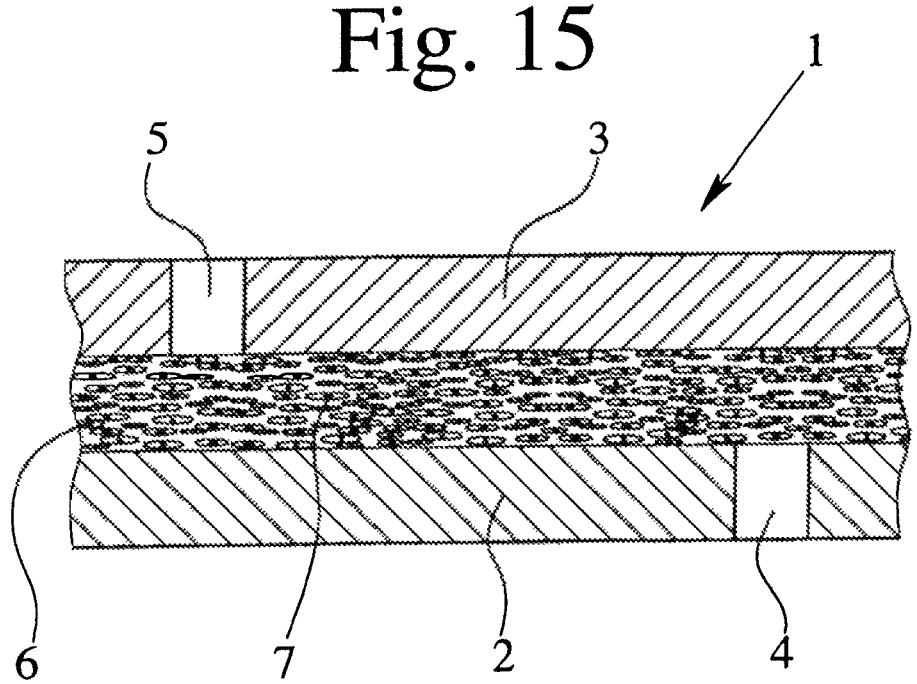
FIG. 16 shows a cross-sectional view of another embodiment of a laminate according to the invention.

Shown in FIG. 16 is another embodiment, in which the structure 6 is formed as a functional plane by a stretched highly filled sheet which, on account of the stretching, has elliptical pores, which communicate with one another. Here, too, the porosity is obtained in the plane of the laminate 1, and consequently transversely to the layer structure.

Figure 17:
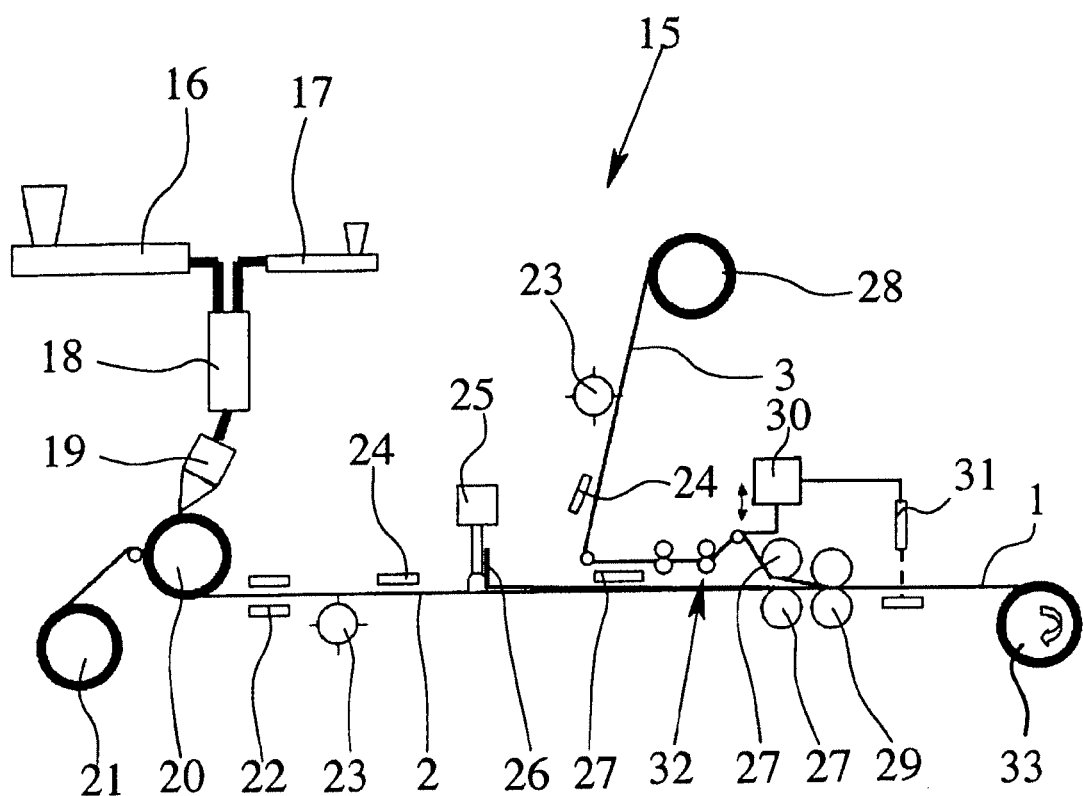
FIG. 17 shows a schematic representation of an embodiment of an apparatus according to the invention for producing a laminate according to the invention.

The laminate 1 can be produced in various ways. Shown in FIG. 17 is an apparatus 15 with which a laminate 1 can be produced. Here, a first outer layer 2 is produced by starting plastics being fed by way of a main extruder 16 and a secondary extruder 17 to a coex block 18. The plastics material is then fed by way of a die 19 to an unstructured casting roller 20. The casting roller 20 is in the present case assigned an unwinding unit 21, which may serve for providing a further layer, for example a reinforcement. However, it is pointed out that the unwinding unit 20 is not absolutely required. The casting roller 20 is followed by a thickness measuring device 22, which is followed in turn by a perforating device 23. This is then used for introducing perforations 4 into the outer layer 2. Following the perforating device 23, an activating device 24 is provided. This may involve a corona or plasma activation or else the application of a primer. Downstream of the activating device 24 in the direction of production there is a foaming unit 25, in which, for example, a dispersion of an acrylic resin is mixed with ammonium stearate and expanded with air, so that, for example, a foam density of between 300 and 400 g/l is obtained. The foam obtained in this way is then applied to the activated side of the outer layer 2 by means of a doctor blade 26.

In the exemplary embodiment shown, the acrylic foam is applied to the outer layer 2 at 30 to 50 g/m² and predried at a temperature of between 70° and 100° over a predetermined time period, for example between 10 and 30 seconds. One or more preheating devices 27, which may be IR radiators, hot-air emitters and/or heated rollers, may be used for this purpose.

A further outer layer 3 is fed from above to the outer layer 2, on which the foam is located, by means of an unwinding unit 28, is perforated by means of a perforating device 23 and is surface-activated by means of an activating device 24. Subsequently, the two outer layers 2, 3 are laminated by means of a calender 29, it being possible to dispense with an adhesive since the foam itself forms the adhesive.

A controlling device 30, coupled with which there is on the one hand, downstream of the calender 29, a measuring device 31, for example in the form of an HR camera, and on the other hand an adjusting device 32, serves for achieving a specific offsetting of the perforations 4, 5 in the respective outer layers 2, 3. The adjusting device 32 can be used to delay the feeding of the outer layer 3 in such a way as to obtain an offsetting of the individual perforations 4, 5 in the outer layers 2, 3. It should be pointed out that it is also possible, in principle, to achieve the offsetting of the perforations by means of the unwinding device 28. Finally, the finished laminate 1 is wound up onto a winding-up unit 33.

In the case of an actual exemplary embodiment of a laminate 1 with a foamed functional plane, a flat sheet of 12 g/m² PET is produced, in particular extruded. This is followed by hot-needle perforation with 40 perforations per cm². The perforations have a diameter of about 80 μm. A dispersion of an acrylic resin is mixed with ammonium stearate and expanded with air in a beater mixer, so that a foam density of 350 g/l is produced. The one outer layer 2 is coated after corona pre-treatment with 40 g/m² of the acrylic foam and pre-dried for 20 seconds at 85° C. The second corona-pre-treated outer layer 3 is then fed in and the composite is formed by means of a calender at 80° C. and under 500 N/cm. This is followed by fixing for 40 seconds at 115° C. This then leaves 23 g/m² dry weight of the foam. The laminate has a seal-tightness under a water column of 830 cm and a water vapor permeability of 340 g/m²×d.

Figure 18:
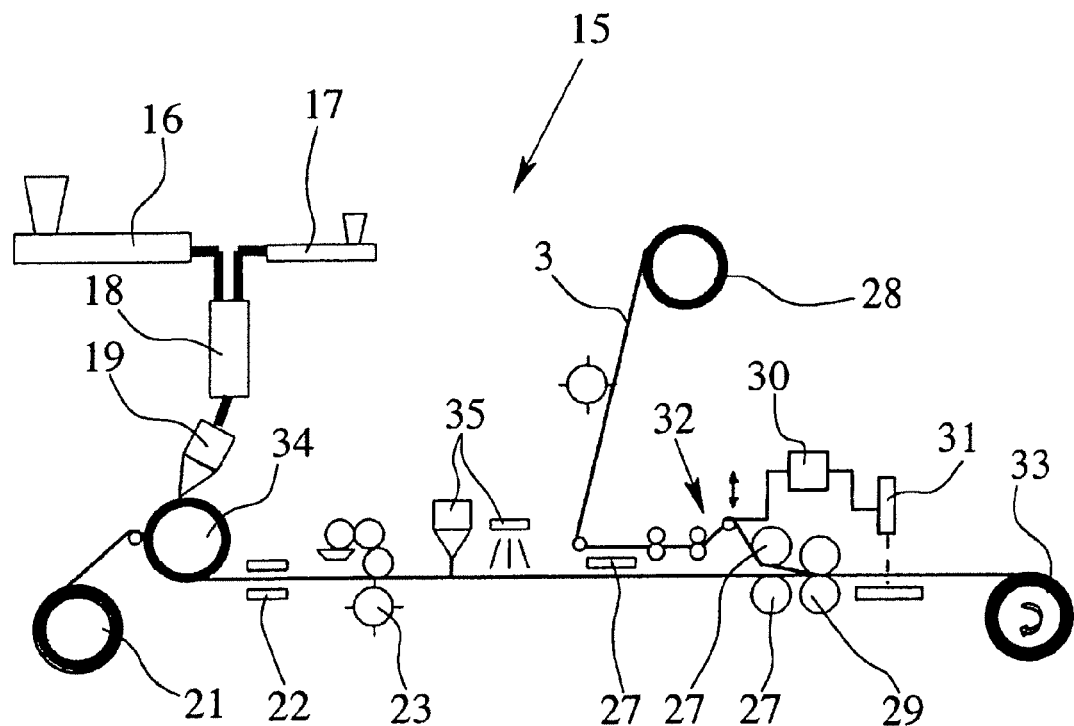
FIG. 18 shows a schematic representation of a further embodiment of an apparatus according to the invention for producing a further laminate according to the invention.

Shown in FIG. 18 is an apparatus 15 which is at least partly similar to the apparatus 15 according to FIG. 17. Here, however, the structure 6 is not produced by a separate layer but is located on the outer layer 2 itself, that is by a structured casting roller 34 being used instead of an unstructured casting roller 20, the sheet thereby being extruded onto the structured casting roller 34, so that the microstructure of the casting roller 34 is replicated in the sheet. Since there is no foam structure 6, there is no need for the foaming unit 25. Instead, an adhesive applying device 35 is provided, it being possible for the application of adhesive to take place by means of a nozzle or by means of spraying. Otherwise, the apparatus 15 corresponds to the embodiment described above, in particular as far as the outer layer 3 is concerned. What is important here is that the microstructure of the especially microstructured casting roller 34 is replicated by the latter in the melt film as a channel structure and fixed by the sheet being cooled down. In a further step, the outer layer is then perforated and subsequently laminated by means of adhesive with a second outer layer produced in the same way. The second outer layer 3 has been previously produced correspondingly by means of a structured casting roller and wound up. The two outer layers are then brought together in such a way that a channel structure with crossed channels is thereby obtained.

In an actual embodiment, in a first operation, a sheet of 15 g/m² PP homopolymer and 3 g/m² PP random copolymer is co-extruded onto the structured casting roller 34. The following channel structure, displaced by 35° with respect to the running direction of the sheet, is thereby cast: channel width: 7 μm, channel depth 5 μm, land width 17 μm. After the structuring, perforation takes place by punching holes with a diameter of 500 μm and a hole density of 2/cm². In the second operation, the same procedure is repeated. After the perforation, the first operation proceeds in such a way that the channel structures come to lie facing one another, crossed at an angle of 70°. Before the two surfaces come into contact, preheating is performed by means of an infrared radiator. The composite is produced by a pair of calender rollers and fixed during the cooling down of the laminate. A high-resolution camera records the offset of the perforations and controls the relative position of the perforations with respect to one another by means of two pairs of tension rollers and an edge controller. On the laminate 1, a water column of more than 150 cm and a water vapor permeability of 225 g/m²×d are measured.

Figure 19:
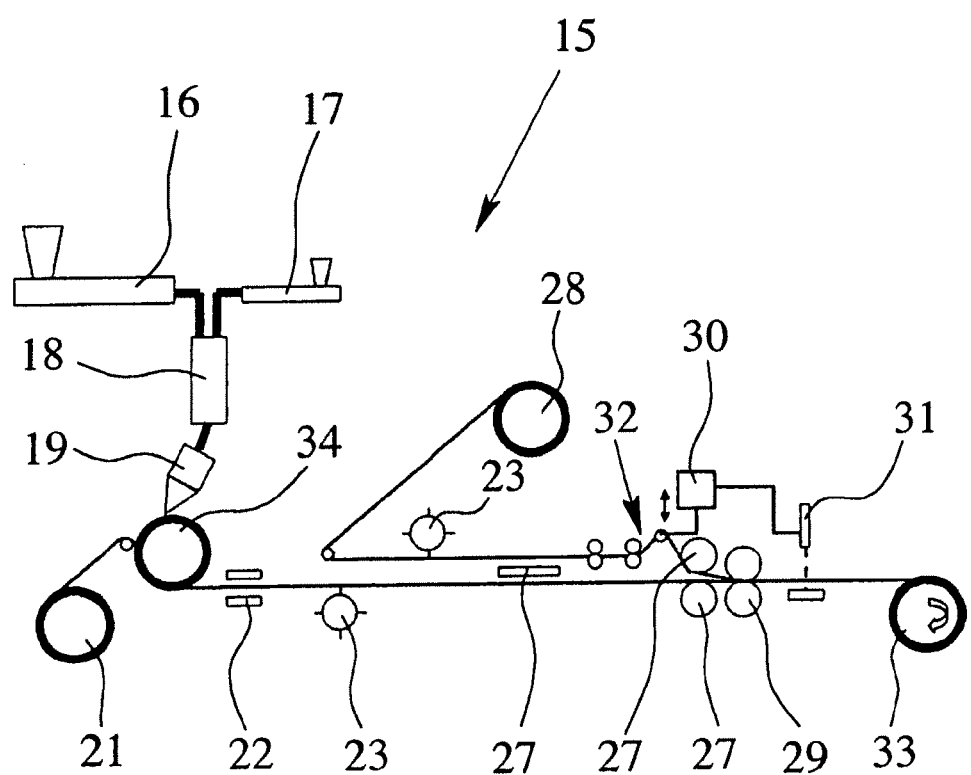
FIG. 19 shows a schematic representation of a further embodiment of an apparatus according to the invention for producing a further laminate according to the invention.

FIG. 19 shows an apparatus 15 which corresponds substantially to the apparatus 15 from FIG. 18. The only difference is that the lamination no longer takes place by means of adhesive but thermally. Accordingly, there is no adhesive applying device.

In a further actual embodiment, in a first operation a PET spunbonded nonwoven of 20 g/m² is extrusion-coated with a coex sheet of 20 g/m² PET and 2 g/m² PBT on an unstructured casting roller. The coating takes place on the PET side of the sheet. This is followed by hot perforation with a hole diameter of about 80 μm and a hole density of about 20/cm².

In the second operation, a sheet of 20 g/m² PET is extruded onto a structured casting roller as a PET spunbonded nonwoven of 20 g/m² is provided. The following channel structure is thereby replicated: channel width: 10 μm, channel depth 10 μm, land width 20 μm. The lands of the casting roller are roughened by blasted abrasive material such that nubs of a dimension of 800 nm are located on the base of the channels in the cast sheet. This pre-laminate is then hot-perforated with a hole diameter of about 80 μm and a hole density of about 20/cm². Then the unstructured layer is provided and the two layers are preheated by rollers. The PBT seal layer of the first operation further undergoes preheating by means of an infrared radiator before the layers are joined by means of a calender in such a way that the seal layer and the structure are facing one another. The arrangement of the perforation is controlled in the same way as in the previous example. On the laminate 1 of the nonwoven-layer-layer-nonwoven structure a water column of 70 cm and a water vapor permeability of 570 g/m²×d are measured.

In the case of an alternative production method, a channel structure or crossed channel structure is introduced into an already perforated thermoplastic polyolefin film by means of a microstructured embossing roller in a hot embossing process. In this case, the outer layer is then heated up to the melting range and impressed with the correspondingly structured roller. During the cooling down of the outer layer, the channel structure then remains in the sheet, it being immaterial here whether the sheet or outer layer is already perforated or this step only takes place subsequently.

Figure 20:
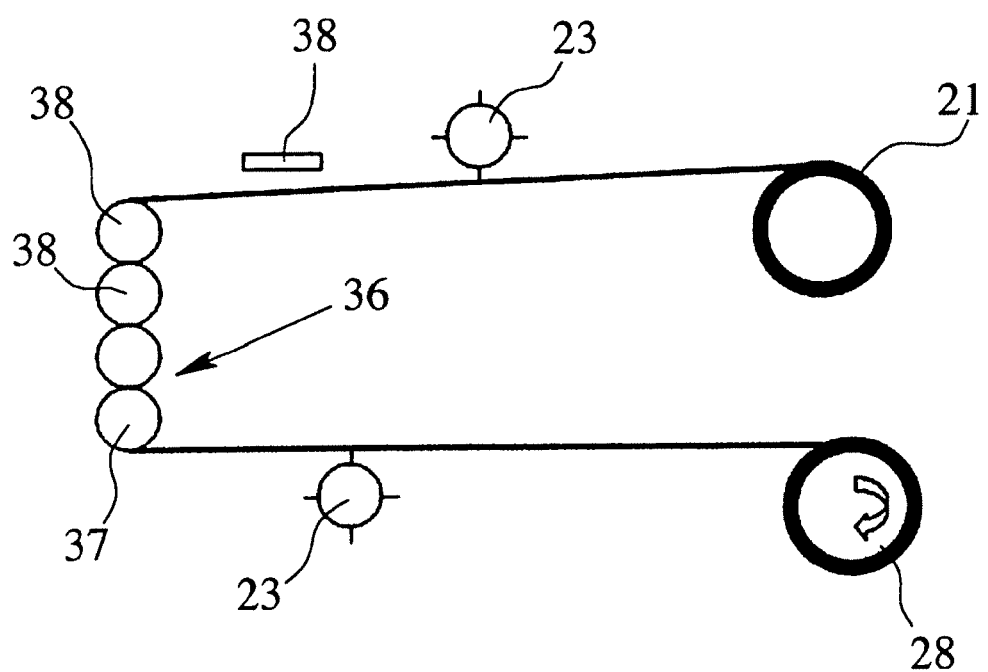
FIG. 20 shows a schematic representation of a further embodiment of an apparatus according to the invention for producing a further laminate according to the invention and FIG. 21 shows a schematic representation of a further embodiment of an apparatus according to the invention for producing a further laminate according to the invention.

The production of an embossed sheet or outer layer is schematically represented in FIG. 20. An unstructured flat sheet is unwound from an unwinding unit 21. Perforating may then take place by means of a perforating device 23. This may, however, also only take place at a later point in time. The sheet is fed to a calender 36, which has a structured embossing roller 37. Upstream of the calendar 36 are means 38 for preheating. These may be heated rollers and/or a heating device, such as an IR radiator or hot-air emitter. As mentioned above, the embossing roller 37 may be followed by a perforating device 23, while the outer layer produced in this way is then wound up onto a winding-up unit 28.

After producing the two outer layers 2, 3, they are joined to one another by lamination, ultimately producing a crossed channel structure with offset perforations 4, 5, in order to obtain the desired structure of a sheet that is open to diffusion and at the same time seal-tight up to a specific hydrostatic pressure. It is important that a complete bond of the two outer layers 2, 3 is produced over all the land-land crossing points or at the joining locations 14, since missing joins may lead to leakages. Before the lamination, it must be ensured that the two outer layers are formed and arranged offset in relation to one another in such a way that the number of channel locations between two perforations 4, 5 in the two outer layer planes is at least 1, preferably 3, and in particular 5.

The sheet or outer layer 2 is then provided by a roller application method with a very thin film of a one-component or two-component adhesive system that contains solvent or is free from solvent and is subsequently laminated with a second perforated outer layer 3 in such a way that the perforations in the two layer planes are not congruent. In the case of the channel structures in both outer layers 2, 3, it is important that the channels of the two sheets 2, 3 cross over, the angle ultimately being of secondary importance. In the case of an outer layer 2 with a crossed channel structure, the outer layer 3 may be smooth or unstructured, as shown for example in FIGS. 13 and 14. In this case, it is suitable to provide the smooth outer layer 3 with an adhesive film and to laminate on the structured outer layer 2. For improved wetting of the outer layers 2, 3 with the adhesive, a corona pretreatment is advisable.

In the case of a further application example, it is provided that a thermoplastic polyolefin film is produced by means of extrusion and is given a channel structure of micro-channels or crossed micro-channels by a correspondingly structured casting roller. In the further process, the outer layer 2 is brought together with a second outer layer 3 by means of a roller provided with small cutters, the two outer layers being provided simultaneously with perforations in the form of small slits. After slight lateral offsetting of the two outer layers 2, 3 in relation to one another, they are thermally laminated to one another. The length of the slits may in this case lie in the range between 0.5 mm and 2 mm, the distance between the slits lying in the same range. The lateral offsetting of the slits in the composite is chosen such that no slit in the outer layer 2 has direct contact, or even only partly coincides, with a slit in the outer layer 3 and at least one, preferably three, and in particular five, channel locations lie between the slits.

In the case of a further application example for the structuring in the functional outer layer, an intermediate fiber layer is used, produced directly in the extrusion process by allowing fibers or laid fiber structures to run together, the dimensions of the fibers being such that the cross section A mentioned at the beginning is obtained. By allowing these fibers to run into the melt film, they are securely incorporated into the carrier sheet or layer. If the fiber material is chosen appropriately (for example bico fibers), it is possible during thermal lamination for specifically only the shell of the fibers to be incipiently melted, which leads to preservation of the relevant structural dimensions.

Figure 21:
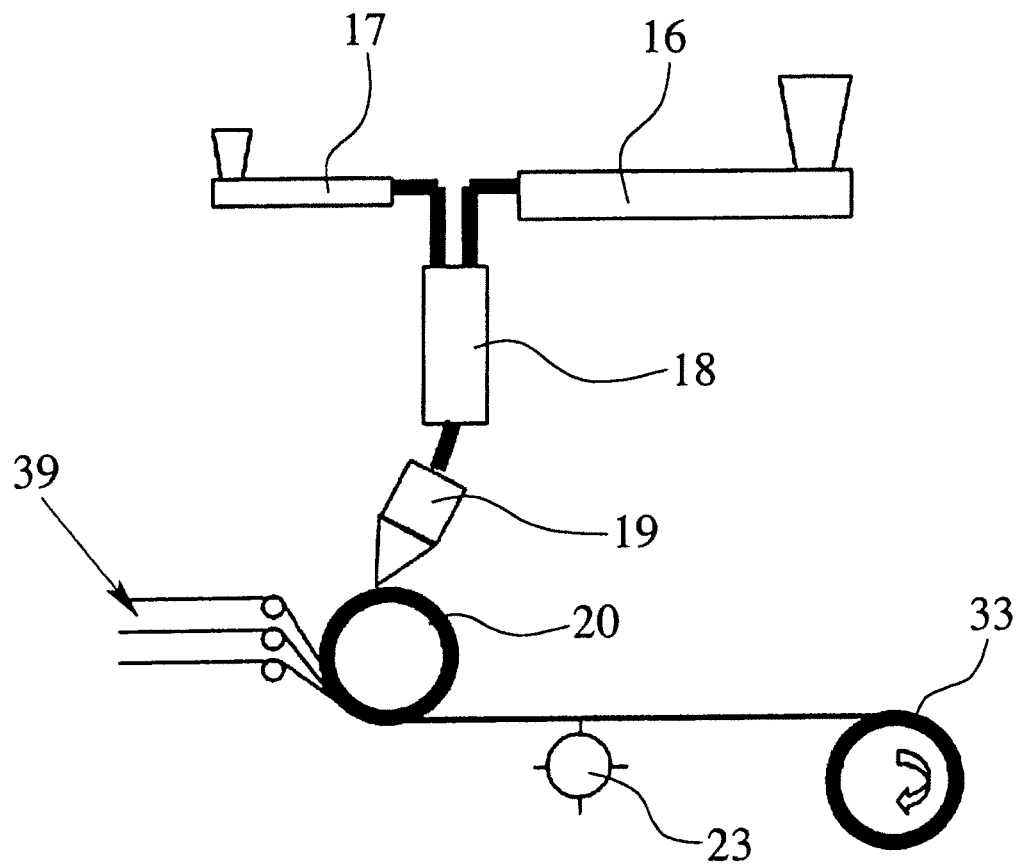

An exemplary embodiment of an apparatus for producing an outer layer in this respect is shown in FIG. 21. In this case, a sheet is co-extruded onto an unstructured casting roller 20. At the same time, fiber material 39 is fed in and incorporated into the melt film. The sheet is then perforated by means of the perforating device 23 and subsequently wound up on the winding-up unit 33.

Furthermore, the structures may be printed onto the smooth sheets, such as for example by the so-called "reel-to-reel" method, or be applied by way of spray application of adhesives or the like. What is important here is that the structures printed or sprayed on produce the aforementioned dimensions with respect to the lands and channels, and in particular the cross section A. If adhesives of the appropriate dimensions are used, the structuring process and the lamination can be carried out in one step.

What is claimed is:

1. A building comprised of a roof and wall, wherein the roof and/or wall further comprise a diffusion-open membrane, laminate building structure, comprising:
   at least one first outer layer and
   at least one second outer layer,
   wherein the outer layers have perforations and are joined to one another in such a way that the perforations of the first outer layer do not coincide with the perforations of the second outer layer, and
   wherein a structure having pores is provided between the outer layers, each of the pores having a clear cross-sectional area of less than 100 μm$^2$
   wherein the structure will enable excess moisture in the air of a room to be diffused out through the laminate in a controlled manner while, ensuring sufficient seal-tightness with respect to the passage of water.

2. The building according to claim 1, wherein the structure is one of a foam, at least one porous sheet, a channel structure formed on at least one outer layer, fibers and a structured adhesive.

3. The building according to claim 1, wherein the wherein the structure is a porous sheet formed of a filled, stretched sheet.

4. The building according to claim 1, wherein the structure is a channel structure provided on at least one outer layer, the pores being channels delimited by lateral lands.

5. The building according to claim 4, wherein a width/depth ratio of the channels is between 10:1 and 1:10.

6. The building according to claim 4, wherein a width/depth ratio of the channels is between 2:1 and 1:2.

7. The building according to claim 4, wherein one outer layer has a channel structure with crossed channels, the channels crossing at an angle of between 5° and 175°, and wherein another outer layer is unstructured, a channel location being obtained at a crossing point between a channel of the one outer layer and the other outer layer and a joining location being obtained at a crossing point between a land of the one outer layer and the other outer layer.

8. The building according to claim 4, wherein the channels have raised substructures and wherein dimensions of the substructures are at most ⅕ of the smallest channel dimensions.

9. The building according to claim 7, wherein the unstructured outer layer has an adhesive on its side facing the structured outer layer.

10. A method of making a building comprised of a roof and wall, the roof and/or wall, wherein the roof and/or wall further comprise a diffusion-open membrane, laminate building structure, comprising the steps of:
   providing a building with a roof and wall, and
   providing the roof and/or wall with first and second perforated outer layers;

coating one of the outer layers with foam having pores and applying the other of the outer layers to the foam so as to join the layers to one another by the foam and in a manner in which the perforations of the first outer layer do not coincide with the perforations of the second outer layer and in which pores having a clear cross-sectional area of less than 100 μm² are provided between the outer layers.

11. A method of making a building comprised of a roof and wall, the roof and/or wall, wherein the roof and/or wall further comprise a diffusion-open membrane, laminate building structure, comprising the steps of:

provide a building with a roof and wall, and providing the roof and/or wall with first and second perforated outer layers;

laminating a sheet, having pores with a clear cross-sectional area of less than 100 μm², between the two external outer layers so that the perforations of the first outer layer do not coincide with the perforations of the second outer layer.

12. A method of making a building comprised of a roof and wall, the roof and/or wall, wherein the roof and/or wall further comprise a diffusion-open membrane, laminate building structure, comprising the steps of:

extruding a melt film being onto at least one microstructured casting roller to produce an outer layer in which the microstructure of the casting roller is cast in the melt film as a channel structure, laminating the outer layer to at least one other outer layer, providing pores having a clear cross-sectional area of less than 100 μm² between the outer layers;

forming a laminate building structure, and providing a wall and/or roof structure with said laminate building structure so as to enable excess moisture in the air of a room to be diffused out through the laminate building structure in a controlled manner while, ensuring sufficient seal-tightness with respect to the passage of water.

13. Method according claim 12, wherein the channel structure has lands and wherein is adhesive applied only to upper sides of the lands.

* * * * *